Patented May 19, 1931

1,806,563

UNITED STATES PATENT OFFICE

ALPHONS PRILL, OF WIESDORF, AND ROBERT WALTER, OF DESSAU, GERMANY, ASSIGNORS TO AGFA ANSCO CORPORATION, OF BINGHAMTON, NEW YORK, A CORPORATION OF NEW YORK

PROCESS OF PRODUCING 4-SUBSTITUTION PRODUCTS OF THE QUINOLINE SERIES

No Drawing. Application filed March 29, 1929, Serial No. 351,109, and in Germany March 22, 1928.

The present invention relates to the production of 4-substitution products of the quinoline series, more particularly to the process of condensing a primary arylamine with a compound of the general formula

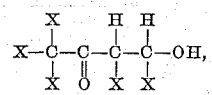

X meaning hydrogen or a univalent substituent, and to a particularly simple manner of separating the reaction product.

We have found that 4-substitution products of the quinoline series are obtainable in a considerably better yield than by all known methods, by starting from compounds of the general formula $CX_3.CO.CHX.CHXOH$, X meaning hydrogen or a univalent substituent (generally denominated as $\beta$-keto-alcohols). These are condensed with primary aromatic amines in the presence of an agent which eliminates water, and of an oxidizing agent. The condensation probably occurs according to the following formula:

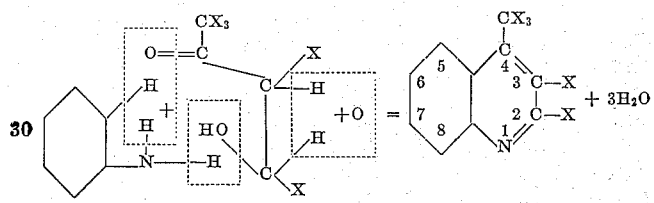

As an agent which eliminates water, for instance, sulfuric acid, phosphoric acid, phosphorpentoxide may be used and as oxidizing agent nitrobenzene, arsenic acid or others.

The quinolines obtained according to this process may be separated directly from the reaction mixture after dilution with water, or the reaction mixture may be distilled with steam after separation of the excess of the oxidizing agent and after the reaction mixture has been made alkaline.

We have further found that the product of the reaction may be separated in a new and particularly simple manner by converting it into the acid salt of hydroferrocyanic acid. The pure quinoline base can be freed from this salt, which is composed of 2 molecules of base and 1 molecule of hydroferrocyanic acid, by addition of caustic soda lye.

The following examples illustrate the invention:—

*Example 1.—4-methylquinoline from aniline and 1-hydroxy-3-ketobutane*

20 grams of 1-hydroxy-3-ketobutane (made, for example, as described in German specification No. 223,207) are mixed with 40 grams of aniline and 20 grams of nitrobenzene. Into this mixture are allowed to flow gradually, while shaking vigorously, 50 cc. of concentrated sulfuric acid. The mixture, which is strongly heated by the heat of reaction evolved when sulfuric acid has been added, is allowed to cool, then diluted with water and boiled to expel the excess of nitrobenzene. The mixture is now made alkaline and distilled with steam. The distillate is mixed with an excess of hydrochloric acid, and a solution of potassium ferrocyanide is added until the ferrocyanide of the base is precipitated. The yield amounts to 34 per cent. of the theoretical. The reaction probably takes place as follows:

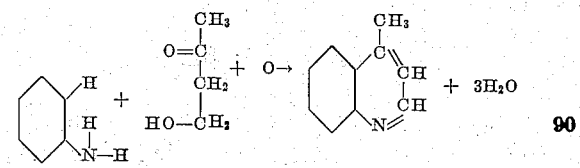

*Example 2.—4.6-dimethylquinoline from paratoluidine and 1-hydroxy-3-ketobutane*

Into a mixture of 45 grams of para-toluidine with 20 grams of 1-hydroxyl-3-ketobutane and 20 grams of nitrobenzene are introduced gradually, while shaking, 50 cc. of concentrated sulfuric acid and the mixture is worked up in the manner described in Example 1. The yield is 10 per cent. of the theory.

*Example 3.—3.4-dimethylquinoline from aniline and 4-hydroxy-2-methyl-3-ketobutane*

40 grams of aniline are mixed with 35 grams of 1-hydroxy-2-methyl-3-ketobutane and 20 grams of nitrobenzene. Into this mixture 50 cc. of concentrated sulfuric acid are introduced gradually, while stirring, and the whole is then worked up as described in Example 1. The yield is 16 per cent. of the theory, the reaction probably occurs according to the following formula:

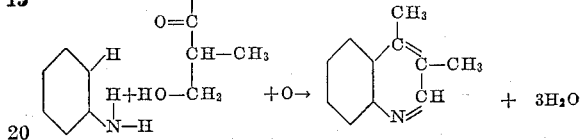

We claim:

1. Process of producing 4-substitution products of the quinoline series which comprises condensing a primary arylamine with a compound of the general formula

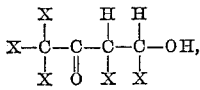

X meaning hydrogen or an alkyl group, in the presence of an agent which eliminates water, and of an oxidizing agent.

2. Process of producing 4-substitution products of the quinoline series which comprises condensing a primary arylamine with a compound of the general formula

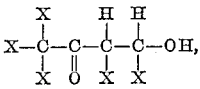

X meaning hydrogen or an alkyl group, in the presence of an agent which eliminates water, and of an oxidizing agent, and isolating the reaction product in the form of its acid salt of hydroferrocyanic acid.

3. Process of producing 4-methyl-derivatives of the quinoline series which comprises condensing a primary amine of the benzene series with a compound of the general formula:

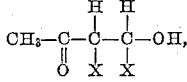

X meaning hydrogen or an alkyl group in the presence of an agent which eliminates water and of an oxidizing agent.

4. Process of producing 4-methylquinoline which comprises condensing aniline with 1-hydroxy-3-ketobutane in the presence of an agent which eliminates water and of an oxidizing agent.

5. Process of producing 4-methyl-derivatives of the quinoline series which comprises condensing a primary amine of the benzene series with a compound of the general formula:

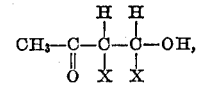

X meaning hydrogen or an alkyl group, in the presence of concentrated sulfuric acid and of nitrobenzene.

6. Process of producing 4-methylquinoline which comprises condensing aniline with 1-hydroxy-3-ketobutane in the presene of concentrated sulfuric acid and of nitrobenzene.

7. In the manufacture of 4-alkyl-derivatives of the quinoline series the step which comprises separating the quinoline derivative in form of an acid salt of ferrocyanic acid.

In testimony whereof, we affix our signatures.

ALPHONS PRILL.
ROBERT WALTER.